Figures 1, 2:
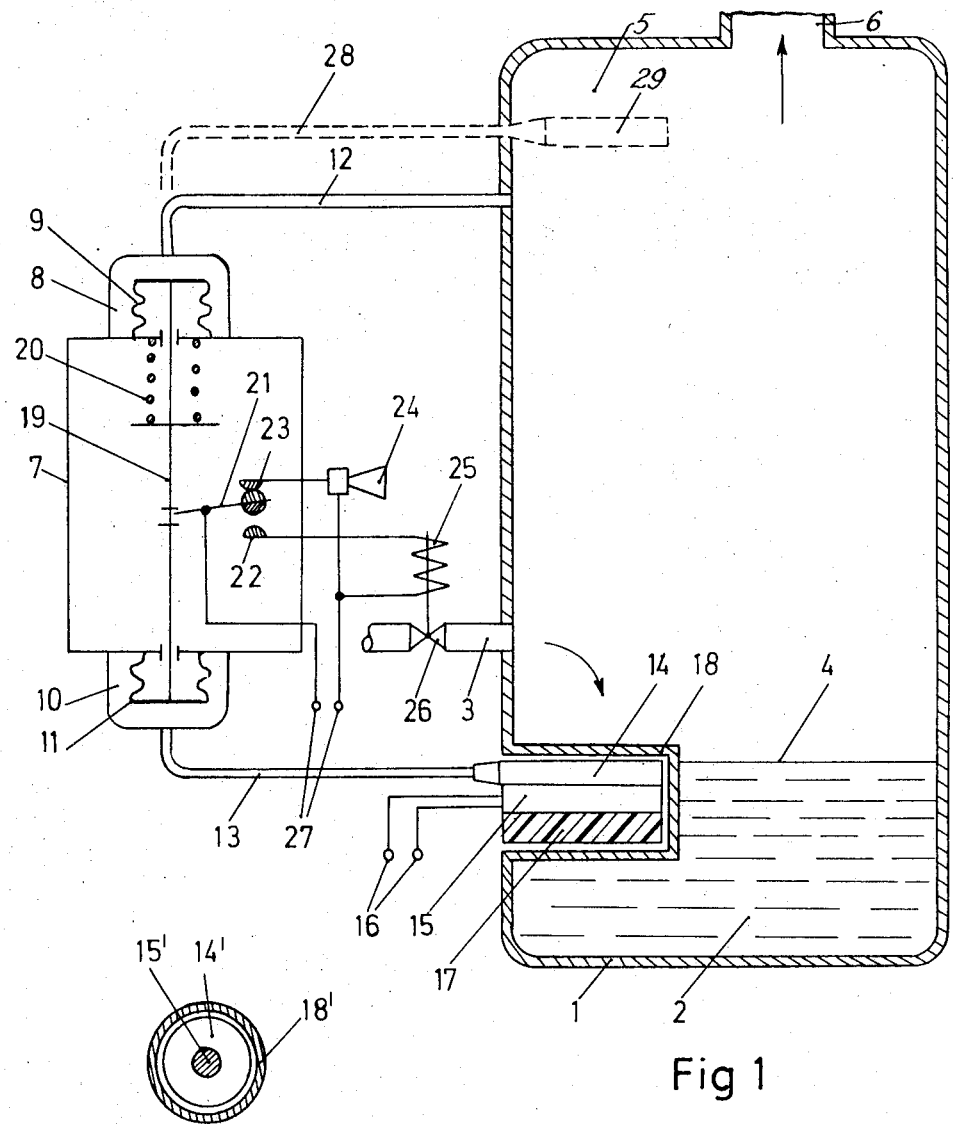

United States Patent

[11] 3,562,546

[72] Inventor Asger Kraemer
Nordborg, Denmark
[21] Appl. No. 816,328
[22] Filed Apr. 15, 1969
[45] Patented Feb. 9, 1971
[73] Assignee Danfoss A/S
Nordborg, Denmark
a company of Denmark

[54] APPARATUS FOR LIMITING THE LEVEL OF A LIQUID IN A CONTAINER
6 Claims, 2 Drawing Figs.
[52] U.S. Cl. .................................................. 307/117,
73/295, 337/322, 337/324
[51] Int. Cl. ................................................ H01h 37/00
[50] Field of Search .......................................... 307/117;
73/295; 137/393, 394; 337/320, 321, 322, 324

[56] References Cited
UNITED STATES PATENTS
2,978,691 4/1961 Beher ........................... 73/295X
3,138,023 6/1964 Washburn .................... 73/295

Primary Examiner—Robert S. Macon
Assistant Examiner—H. J. Hohauser
Attorney—Wayne B. Easton ABSTRACT: The invention relates to control apparatus for limiting the level of the liquid in a container to a predetermined level. A thermostatic element combined with a heating element comprises an assembly which senses and is subjected to a relatively lower temperature when surrounded by a liquid in the container than it does when the liquid level is lower than the level of the assembly. The mode of operation is based on the thermostatic element operating an electrical switch, through pressure responsive means, which controls the supply of liquid to the container. The switch has on and off positions which correspond to the upper and lower temperatures to which the thermostatic element is subject. The absolute values of the upper and lower temperatures to which the thermostatic valve may be subjected may vary substantially depending on the temperature of the liquid and the ambient temperature but the temperature differential between the absolute temperatures is substantially constant. The invention involves the providing of pressure compensating means so that it is only the temperature differential between the upper and lower temperatures to which the thermostatic element is subjected that causes the switch to be actuated to its on or off position.

PATENTED FEB 9 1971 3,562,546

APPARATUS FOR LIMITING THE LEVEL OF A LIQUID IN A CONTAINER

The invention relates to apparatus for checking the level of a liquid in a container, which apparatus, when a predetermined state of fill is reached, actuates a switching element for cutting off the supply of liquid, the system being particularly intended for use on refrigerant evaporators.

A large number of devices for monitoring the level of a liquid are known In the majority of cases, they utilize a float. Moving parts in the container to be monitored often lead to trouble, however. Other devices operate electrically, for example by measuring the conductivity of the medium between two electrodes projecting into the container. In such a case, the liquid must, however, possess a certain minimum conductivity. Furthermore, an evaluator switching means is required and this often responds too readily. When troubles occur in the system (jamming of the float, voltage-drop in the measuring circuit), overfilling can very easily occur.

The object of the invention is to provide apparatus for checking the level of a liquid, that is of very simple construction, operates in a reliable manner and applies forces to the switching element that actuates it in a safe manner.

According to the invention, this object is achieved by the switching element being actuated by two working elements, such as bellows, acting in opposite directions to each other, and possibly by a spring, the first of which working elements is under a vapor pressure, that corresponds to the temperature in the container above the liquid, and the second working element is under a pressure produced by a temperature sensor, which is positioned at the level of the predetermined state of fill and with which is associated an additional constant heating means.

As a result of the heating, a certain equilibrium temperature is set up in the temperature sensor, which temperature is dependent upon the dissipation of heat to the surrounding zone. If the temperature sensor is below the level of the liquid, more heat is dissipated by the greater thermal conductivity of the liquid and a lower temperature is set up than when the sensor is above the level of the liquid. The temperature of the sensor corresponds to a certain condition of expansion and therefore to a prescribed loading of the second working element. The two temperature values of the sensor are, of course, only relatively fixed with respect to each other; their absolute levels can vary in dependence upon the temperature of the container. This is particularly important if the liquid itself can acquire very differing temperatures, for example a refrigerant in a cooling system. Due to the first working element, however, there occurs a compensation such that overall changes in temperature of this kind cannot have any effect on the actuation of the switching element. Since, with the help of the working element, very considerable forces can be applied, reliable actuation of the switching element is ensured. The temperature sensor can have, for example, an absorptive filling or some other suitable filling, such as a vapor or liquid-vapor filling.

If the heat supply fails, (failure of current, burnout of the heating coil) the checking apparatus automatically switches off since the sensor then becomes cool. If the temperature sensor develops a leak, the checking apparatus is likewise switched off.

The first working element can also be connected to a pressure-producing temperature sensor. The two systems can therefore be designed in substantially the same manner.

A further possible use occurs in the case of liquids, the vapor-pressure of which is dependent upon temperature. Here, the first working element can be directly connected to the interior of the container above the liquid.

A particularly favorable arrangement results from fitting a heating element along the central axis of the temperature sensor, since the greatest possible area for the transfer of heat to the container is then available.

One of several conditions of fill can also be monitored with the help of the same apparatus if there are at least two levels of fill that are covered by an inwardly projecting portion of the wall of the container and if the temperature sensor of the second working element and its heating element, and possibly its insulating element, are interchangeably arranged one upon the other in the inwardly projecting portion. By simply turning round the superposed elements, the temperature sensor is set at another level, so that it responds when another state of fill is reached.

An electric switch can be used as the switching member, this controlling a magnetic valve or a relay. The switch can be of robust design because of the large displacement forces present and can carry the full magnetic current.

The invention will now be explained in more detail by reference to embodiments illustrated schematically in the drawings, wherein:

FIG. 1 shows the checking apparatus of the invention in the fitted condition, and FIG. 2 is a cross section through another form of the temperature sensor.

Liquid refrigerant 2 is to be passed into a container 1 through a pipe 3 until a prescribed level 4 is reached. Above the level of the liquid is a vapor chamber 5. From this, refrigerant in vapor form is discharged through an outlet 6.

A checking apparatus 7 comprises a first working element 8 having a bellows 9 and a second working element 10 with a bellows 11. The first working element is connected directly to the vapor chamber 5 by way of a pipe 12. The second working element is connected, by way of a capillary tube 13, to a temperature sensor 14, which has an absorptive filling or some other suitable filling. The temperature sensor 14 is heated by means of a resistor 15, which is connected to a constant-voltage source 16. An insulating plate 17 ensures that the heating resistor 15 acts substantially only on the sensor 14. The superimposed parts 14, 15 and 17 are contained in an inwardly projecting portion of the wall of the container 1.

The two working elements act in opposite directions on a rod 19, which is also acted upon by a spring 20. The rod controls a moving contact 21, which, when the liquid-level is too low, cooperates with a fixed contact 22, through which the electromagnet 25 of a magnetic valve 26 is energized. The current is provided by a normal supply 27. Another fixed contact 23 can be used for signalling purposes, for example for actuating a warning device 24.

The working element 8 can also be connected through a capillary tube 28 to a temperature sensor 29, which is fitted in the vapor chamber 5 of the container 1, but which may also be located in the liquid 2.

When the temperature sensor 14 is heated by the resistor 15, it assumes an equilibrium temperature. This temperature is lower when the liquid-level has reached that shown in the drawing than in the case where the level of the liquid is at the lower side of the inwardly projecting portion 18. If the temperature of the sensor 14 is lower, a lower pressure is produced in the element and the working element 10 is less heavily loaded. Consequently, the force of the spring and of the working element 8 predominates The switch assumes the position illustrated, wherein the liquid can no longer flow through the pipe 3. If the level of the liquid now drops, the temperature of the sensor 14 rises and the pressure in the working element 10 increases until finally the force of the spring 20 and the counterpressure from the working element 8 are overcome, so that the switch 21 is reversed and the magnetic valve 26 opens the pipe 3 again. If the surrounding temperature or the liquid and vapor temperature changes, the switch conditions nevertheless remain unchanged, since the working element 8 exercises a compensating effect.

When the layered arrangement of the parts 14, 15 and 17 is reversed, the system switches at a correspondingly lower level of the liquid.

FIG. 2 shows a cylindrical sensor 14', which is fitted in a cylindrical inwardly projecting portion 18' of the container. A heating element 15' is fitted along its central axis. The heat produced thereby passes directly into the interior of the sensor. The entire outer circumference of the sensor is available for transferring heat to the inwardly projecting portion 18'.

I claim:

1. Control apparatus for limiting the level of a liquid in a container to a predetermined level, comprising, a mechanically operated liquid valve control switch having on and off positions, first and second pressure responsive elements operable in mutually opposite directions, said first element means connected to said container for transmitting pressures to said first element corresponding to pressures and temperatures in said container, a temperature responsive sensor member attached to said container and positioned at said predetermined level relative to said container, said second element having fluid communication with said sensor member, said sensor member having means for translating varying temperatures applied thereto to correspondingly varying pressures which are transmitted to said second element, heating means in close proximity to said sensor member, and means connecting said elements to said switch.

2. Control apparatus according to claim 1 including a second pressure producing sensor member, said second sensor member having the sensing end thereof in the interior of said container, said second sensor member being connected to and having fluid communication with said first pressure responsive element.

3. Control apparatus according to claim 1 wherein said first pressure responsive element has fluid communication with the interior of said container above said predetermined level.

4. Control apparatus according to claim 1 wherein said sensor has an annular portion defining a central bore, said heating means being disposed in said bore.

5. Control apparatus according to claim 1 wherein said container has a recess for receiving said sensor member and said heating element, said sensor member and said heating element being insertable into said recess with said sensor member being optionally above or below said heating element.

6. Control apparatus according to claim 1 wherein said switch is an electrical switch.